United States Patent
Wiedemann et al.

(10) Patent No.: US 11,126,309 B2
(45) Date of Patent: Sep. 21, 2021

(54) TOUCH INPUT DEVICE AND ELECTRONIC SYSTEM FOR A MOTOR VEHICLE, AND MOTOR VEHICLE

(71) Applicant: Bayerische Motoren Werke Aktiengesellschaft, Munich (DE)

(72) Inventors: Daniel Wiedemann, Wolfratshausen (DE); Matthias Lindner, Graefelfing (DE); Gabriel Hairer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/259,204

(22) Filed: Jan. 28, 2019

(65) Prior Publication Data

US 2019/0155447 A1    May 23, 2019

Related U.S. Application Data

(63) Continuation of application No. PCT/EP2017/066539, filed on Jul. 4, 2017.

(30) Foreign Application Priority Data

Jul. 28, 2016    (DE) .................... 10 2016 213 868.5

(51) Int. Cl.
*G06F 3/044*    (2006.01)
*B60K 35/00*    (2006.01)
(Continued)

(52) U.S. Cl.
CPC ............... *G06F 3/044* (2013.01); *B32B 3/00* (2013.01); *B60K 35/00* (2013.01); *B60K 37/06* (2013.01);
(Continued)

(58) Field of Classification Search
None
See application file for complete search history.

(56) References Cited

U.S. PATENT DOCUMENTS

| 2007/0144795 | A1* | 6/2007 | Tran ........................ G06F 3/044 178/18.06 |
| 2009/0033636 | A1* | 2/2009 | Toyota .................... G06F 3/044 345/174 |

(Continued)

FOREIGN PATENT DOCUMENTS

| DE | 10 2011 077 899 A1 | 12/2012 |
| EP | 2 256 602 A2 | 12/2010 |

OTHER PUBLICATIONS

PCT/EP2017/066539, International Search Report dated Sep. 5, 2017 (Two (2) pages).

(Continued)

*Primary Examiner* — Amare Mengistu
*Assistant Examiner* — Sarvesh J Nadkarni
(74) *Attorney, Agent, or Firm* — Crowell & Moring LLP

(57) ABSTRACT

A touch input device configured to operate a system of a motor vehicle includes a cover plate composed of a cover plate material having a plate top side and a plate underside, and also includes a touch sensor surface. The plate top side includes an operating surface, where the plate underside of the cover plate faces the touch sensor surface. The plate underside has at least one beveled surface arranged obliquely with respect to the touch sensor surface such that a clearance is formed between the plate underside and the touch sensor surface. The operating surface at least partly projects beyond the clearance and a filling body composed of at least one filling material is arranged in the clearance, where the filling material has a permittivity for electric fields that corresponds to a permittivity of the cover plate material.

14 Claims, 4 Drawing Sheets

(51) Int. Cl.
  *B32B 3/00* (2006.01)
  *B60K 37/06* (2006.01)
  *G06F 3/0354* (2013.01)
  *G06F 3/0488* (2013.01)

(52) U.S. Cl.
  CPC ........ *G06F 3/03547* (2013.01); *G06F 3/0488* (2013.01); *B60K 2370/126* (2019.05); *B60K 2370/143* (2019.05); *B60K 2370/1468* (2019.05); *G06F 2203/04107* (2013.01)

(56) References Cited

U.S. PATENT DOCUMENTS

2016/0179366 A1* 6/2016 Min ....................... B60K 35/00
  715/863
2017/0147105 A1* 5/2017 Kwon ................... G06F 3/0445

OTHER PUBLICATIONS

German Search Report issued in German counterpart application No. 10 2016 213 868.5 dated Jun. 29, 2017, with Statement of Relevancy (Nine (9) pages).

\* cited by examiner

TOUCH INPUT DEVICE AND ELECTRONIC SYSTEM FOR A MOTOR VEHICLE, AND MOTOR VEHICLE

CROSS REFERENCE TO RELATED APPLICATIONS

This application is a continuation of PCT International Application No. PCT/EP2017/066539, filed Jul. 4, 2017, which claims priority under 35 U.S.C. § 119 from German Patent Application No. 10 2016 213 868.5, filed Jul. 28, 2016, the entire disclosures of which are herein expressly incorporated by reference.

BACKGROUND AND SUMMARY OF THE INVENTION

The present invention relates to a touch input apparatus for a motor vehicle for operating a system, in particular an electronic system, of a motor vehicle. The invention furthermore relates to an electronic system for a motor vehicle, and to a motor vehicle.

Known are a plurality of different touch input apparatuses, such as e.g. touchpads of notebooks or touchscreens of smart phones or the like. A touch input apparatus has a touch-sensitive or pressure-sensitive operating surface and is configured to ascertain the position on the operating surface that is contacted from the outside or onto which a pressure is exerted from the outside. Consequently, for example a trajectory of a finger of an operator sliding on the operating surface is determinable. Modern touch input apparatuses are configured to ascertain not only the position of the contact or of the pressure, but also the strength of the pressure. Touch input apparatuses of this type can also be used to transmit highly complex control commands to a system, in particular to an electronic system of a motor vehicle, such as a navigation system, an entertainment system, a communication system, a vehicle parameter monitoring system or the like.

Conventional touch input apparatuses have a touch sensor surface and a cover plate that protects the touch sensor surface, wherein the operating surface is formed on a plate upper side of the cover plate that is remote from the touch sensor surface. Known touch sensor surfaces have an electrode grid and are configured to ascertain an electrical capacitance between the electrodes. External disturbing factors, such as a finger of an operator of the touch input apparatus that is guided onto the operating surface, cause a change in the electrical capacitance between electrodes due to an electrical permittivity that strongly deviates from air. This change in electrical capacitance is ascertainable by the touch input apparatus, and in this way, the position and possibly the magnitude of the pressure exerted on the operating surface are determinable.

In order to make possible a great accuracy of the position, the cover plate is arranged on the touch sensor surface without any gaps and as surface-extensively as possible. An air gap in a region between the cover plate and the touch sensor surface would, due to influence from the outside, result in a change in the electrical capacitance in this region that deviates from the remaining regions. This makes necessary highly complex compensation of the change in the electrical capacitance that has been ascertained by the touch sensor surface on the part of a computer unit and can result in undesired delays of an input of the operator in particular in the case of a low-performance computer unit. The use of particularly high-performance computer units has the disadvantage of high component costs and high energy consumption during operation of the touch input apparatus.

It is therefore an object of the present invention to eliminate or at least partially eliminate the previously described disadvantages in a touch input apparatus having a sloped surface, an electronic system for a motor vehicle having a touch input apparatus of this type, and a motor vehicle having a system of this type. In particular, it is an object of the present invention to provide a touch input apparatus for operating a system of a motor vehicle, an electronic system for a motor vehicle, and a motor vehicle, which avoid, in a simple and cost-effective manner, the delay of an input of a user in regions of the sloped surface and require a lower compensation of the change in the electrical capacitance that has been ascertained by the touch sensor surface.

Here, features and details which are described in connection with the touch input apparatus of course also apply in connection with the electronic system according to the invention and the motor vehicle according to the invention, and vice versa in each case, with the result that, mutual reference can be made or is made concerning the disclosure relating to the individual invention aspects.

According to the first aspect of the invention, the object is achieved by a touch input apparatus for operating a system of a motor vehicle. The touch input apparatus has a cover plate made from a cover plate material and a touch sensor surface. The cover plate has a plate upper side having an operating surface and a plate lower side, wherein the plate lower side faces the cover plate of the touch sensor surface. According to the invention, the plate lower side has at least one sloping surface that is arranged at an angle with respect to the touch sensor surface, wherein a free space is formed between the plate lower side and the touch sensor surface. The operating surface at least partially projects over the free space. Arranged in the free space is a filling body made of at least one filling material, wherein the at least one filling material has a permittivity for electrical fields that is greater than a permittivity of air. The permittivity of the filling material is preferably closer to a permittivity of the cover plate material than to the permittivity of the air.

The cover plate has a cover plate material and is configured substantially like a plate. The cover plate has a plate upper side and a plate lower side, which is remote from the plate upper side, wherein preferably in a region the plate upper side is arranged parallel with respect to the plate lower side. Formed on the plate upper side is an operating surface, by way of which the user inputs are transmittable to the touch input apparatus. The plate upper side is preferably entirely or at least substantially entirely configured as an operating surface.

According to the invention, the cover plate can be configured to fulfill a multiplicity of different functions. The cover plate covers the touch sensor surface with respect to the operator and consequently protects the touch sensor surface against external influences, such as dust, water or the like. The cover plate is furthermore an optical and/or haptic design element of the touch input apparatus. By veneering, coating, adhesive bonding or the like, the cover plate can completely or at least partially obscure a view to the touch sensor surface. Particularly preferred is a surface of the plate upper side which is as smooth as possible, in particular polished, and/or as planar as possible, so as to improve sliding of the finger of the operator on the plate upper side. The plate upper side can also have a curvature or be configured with a curvature according to the invention. In addition or alternatively, the invention can make provision for the plate upper side to have local elevations and/or depressions and/or roughenings, which suggest or indicate functions of the touch input apparatus.

The touch sensor surface is preferably configured as a touch sensor surface of a conventional touch sensor apparatus and preferably has a multiplicity of electrodes which are distributed over the touch sensor surface in particular uniformly or substantially uniformly and in alternation. The touch input apparatus or touch sensor apparatus is preferably configured for detecting a change in an electrical capacitance between the electrodes.

According to the invention, the plate lower side has at least one sloping surface. A sloping surface within the meaning of the invention is understood to mean a surface that is arranged at an angle with respect to the touch sensor surface. The sloping surface is preferably arranged at an angle with respect to a main surface of the plate lower side, wherein the main surface can be configured to be a real, flat surface or to be an averaged surface from a plurality of surfaces of the plate lower side that are arranged at an angle with respect to one another. The sloping surface is preferably arranged at an angle with respect to the plate upper side. With further preference, the main surface is arranged parallel with respect to the plate upper side. The sloping surface can surround, or at least substantially or partially surround, for example the main surface and is preferably configured in the shape of a ring. Alternatively, the main surface can be surrounded by a plurality of sloping surfaces that are preferably arranged with one another in the manner of a ring or substantially in the manner of a ring. The sloping surface can have a plurality of functions, such as a visual decoration of the touch input apparatus and/or identification of a function of the touch input apparatus, in particular an arrow-type shape. Provision may be made for the sloping surface to be configured to effect a particular refraction of the light, for example in order to produce color or rainbow effects. The invention may furthermore make provision for the touch input apparatus to have at least one light-emitting apparatus, which is configured in connection with the at least one sloping surface for producing a light effect, in particular for identifying a function and/or a state of the touch input apparatus.

Due to the inclined arrangement of the sloping surface with respect to the touch sensor surface, a free space is formed between the sloping surface and the touch sensor surface. The operating surface projects over the sloping surface. In order to prevent complex compensation when using the operating surface in the region that projects over the sloping surface, a filling body made of at least one filling material is arranged in the free space. The filling body preferably has a flexible embodiment in order to facilitate or improve pairing between cover plate and filling body. The filling body furthermore preferably has no cavities in order to prevent a local change in the permittivity. Provision may be made for the filling body to be adhesively bonded to the plate lower side and/or touch sensor surface using an adhesive or using the filling material. Provision may furthermore be made for the filling body to have different thicknesses, in particular to fill intermediate spaces between the touch sensor surface and the cover plate. According to the invention, the at least one filling material has a permittivity for electrical fields which is at least greater than a permittivity of air. The permittivity of the filling material preferably at least substantially corresponds to a permittivity of the cover plate material. The invention can furthermore make provision for the filling body to also extend in a region of the main surface between the plate lower side and the touch sensor surface.

That means that a change in the permittivity of the cover plate in the region of the sloping surface is compensated for, or at least substantially compensated for, by way of the filling body, with the result that no complicated compensation using a cost-intensive computer unit is necessary. This has the advantage that any input by a user in the region of the sloping surface is consequently easily possible without hereby causing too long an input delay. A further advantage is that a complicated computer unit is not necessary and therefore manufacturing costs can be saved. The touch input apparatus according to the invention consequently makes possible a sloping surface in the region of the operating surface of the cover plate without any resulting disadvantages.

According to a preferred development of the invention, provision can be made in a touch input apparatus for the filling body to be in surface contact with the plate lower side and the touch sensor surface. Surface contact in the meaning of the invention is understood to mean a consistent or substantially consistent contact with the result that no, or substantially no, gaps are formed between filling body, plate lower side and touch sensor surface. Contact is consequently made via a common contact surface. Due to the surface contact, the free space is completely or substantially completely filled by the filling body, at least in the region of the operating surface, with the result that a permittivity of the pairing from cover plate and filling body can be kept constant or substantially constant at least over the operating surface. The contact surface can be configured for example to be in the shape of a circle or a ring.

It is preferred according to the invention for the filling body to have a filling body shape which is configured to be complementary to a free space shape of the free space. This improves surface contact of the filling body and the cover plate. A complementary shape has the advantage that making contact over as large a surface as possible of cover plate and filling body is possible. Making contact in this way is further improvable by an elastic filling body material.

The filling body is preferably configured at least partially as an injection molded part or 3D printed part. Alternatively or additionally, it is preferred that the at least one filling material is configured to be injection moldable. Accordingly, the filling body is producible for example before being inserted into the free space or alternatively introducible into the free space as a flowable filling material in order to cure in the free space. A filling body of this type is easily producible with simple means and cost-effectively and is optimally adaptable to a shape of the free space.

With further preference, the at least one filling material is a polyamide or at least includes a polyamide. Polyamide is easily and cost-effectively available and easy to process. Polyamide is well suited in particular for an injection molding process due to a good meltability.

The invention may make provision for the at least one filling material to be formed from a cast resin or to at least include a cast resin and/or adhesive. Filling material of this type is introducible into the free space in flowable form to produce the filling body and can distribute well in the free space. Subsequently, the filling material is curable by cooling and/or by the addition of a curing agent to the filling body. Production methods for producing the filling body that are based on such a cast resin are relatively cost-effective and easily performable with simple means.

In an advantageous configuration of the invention, the filling body has a recess, in which the plate lower side is accommodated. Here, at least the region of the plate lower side that exhibits the at least one sloping surface and intersects with the operating surface is arranged in the recess. The main surface of the plate lower side is preferably also arranged in the recess. In this way, the cover plate is able to be accommodated by the filling body preferably in a form-fitting manner, with the result that the cover plate is reliably arrangeable on the filling body or the filling body on the cover plate with simple means even at the assembly stage of the touch input apparatus. Provision may be made according to the invention for no direct contact to exist between the cover plate and the touch sensor surface, but only via the filling body. In the case of a ring-shaped filling body, direct contact between the cover plate and the touch sensor surface in the region of the main surface may also exist. A ring-shaped filling body preferably has a triangular cross section. Direct contact between the cover plate and the touch sensor surface in the region of the sloping surface is not provided according to the invention, but only via the filling body.

With further preference, the at least one sloping surface is arranged in a periphery region of the cover plate. The main surface is consequently bounded toward the outside in at least one direction by the sloping surface. With preference, the sloping surface substantially or completely surrounds the main surface. The sloping surface is here preferably configured such that the main surface is arranged closer to the touch sensor surface than the sloping surface. The cover plate consequently has a thickness which tapers radially outwardly in a periphery region by way of the sloping surface.

In an advantageous configuration of the invention, the plate lower side has a plurality of sloping surfaces, which are arranged on the plate lower side in the form of a facet cut. The sloping surfaces preferably have a triangular embodiment. With an arrangement of sloping surfaces of this type, a multiplicity of different optical effects are attainable. For example, an arrow-type embodiment of the sloping surfaces can indicate a control function or direction of the touch input apparatus.

The cover plate material is preferably glass or at least includes glass. The cover plate is preferably see-through or at least light-transmissive. Provision may be made for a region of the plate lower side that is in contact with the touch sensor surface and/or the filling body to have a coating. This coating is preferably not see-through and/or light-transmissive and/or made to be reflective. The coating is preferably configured to be a lacquer and/or a film and is furthermore preferably adhesively bonded to the cover plate or connected in an integrally bonded manner. Consequently, the touch sensor surface is cost-effectively laminable with simple means. A cover plate material of this type including glass is easily producible with simple means and cost-effectively and particularly suited for special light effects, in particular light refractions.

It is preferred according to the invention for the permittivity of the at least one filling material to deviate by at most 30% from the permittivity of the glass plate material. With further preference, the permittivity deviates at most by 15%. According to the invention, it is particularly preferred if the permittivity of the at least one filling material deviates at most by 5% from the permittivity of the cover plate material. A permittivity deviation which is as low as possible has the advantage that, when operating the operating surface, no or only a very low compensation of the ascertained change in the electrical capacitance is required in the region of the sloping surface. The closer the permittivity of the at least one filling material corresponds to the permittivity of the cover plate material, the lower is the required compensation and consequently the required computational complexity. It is thus possible to reduce and save costs for a complicated computer unit.

The invention can make provision for the cover plate to exhibit an engraving and/or a print. The engraving and/or the print can here be arranged, in dependence on the cover plate material, on the plate upper side and/or, if the cover plate material is see-through, on the plate lower side. This has the advantage that particular functions of the touch input apparatus are discernible by the user and operation is thus simplified. The plate upper side is preferably configured to be planar and/or round or substantially round. Alternatively or additionally, the plate upper side can also at least partially be configured to be convex and/or concave. A cover plate which is shaped in this way has the advantage that a multiplicity of input commands are easily possible hereby.

According to a second aspect of the invention, the object is achieved by an electronic system for a motor vehicle. The electronic system has at least one input apparatus, wherein the at least one input apparatus is configured to be a touch input apparatus according to the invention. The electronic system has the same advantages as have already been described previously with respect to the touch input apparatus according to the invention. Accordingly, the electronic system has the advantage that the cover plate of the touch input apparatus of the electronic system has at least one sloping surface, wherein input by a user in the region of the sloping surface is thus easily possible without hereby causing too long an input delay. A further advantage is that the electronic system requires no complicated computer unit, and as a consequence, production costs can be saved. The electronic system according to the invention consequently has, in an advantageous manner, a touch input apparatus having a sloping surface in the region of the operating surface of the cover plate, without this causing disadvantages during the operation.

According to a third aspect of the invention, the object is achieved by a motor vehicle having at least one electronic system according to the invention. The motor vehicle has the same advantages as have already been described previously with respect to the touch input apparatus according to the invention and the electronic system. The motor vehicle consequently has the advantage that the cover plate of the touch input apparatus of the electronic system of the motor vehicle has at least one sloping surface, wherein input by a user in the region of the sloping surface is easily possible without hereby causing too long an input delay. A further advantage is that the electronic system requires no complicated computer unit, and production costs can consequently be saved. The motor vehicle according to the invention consequently has, in an advantageous manner, an electronic system having a touch input apparatus having a sloping surface in the region of the operating surface of the cover plate, without this causing disadvantages during the operation.

A touch input apparatus according to the invention for operating a system of a motor vehicle will be explained below in more detail with reference to drawings. The figures show, in each case schematically:

Other objects, advantages and novel features of the present invention will become apparent from the following detailed description of one or more preferred embodiments when considered in conjunction with the accompanying drawings.

Elements having the same function and mode of operation are provided in FIGS. 1 to 4 in each case with the same reference signs.

DETAILED DESCRIPTION OF THE DRAWINGS

Figure 1:
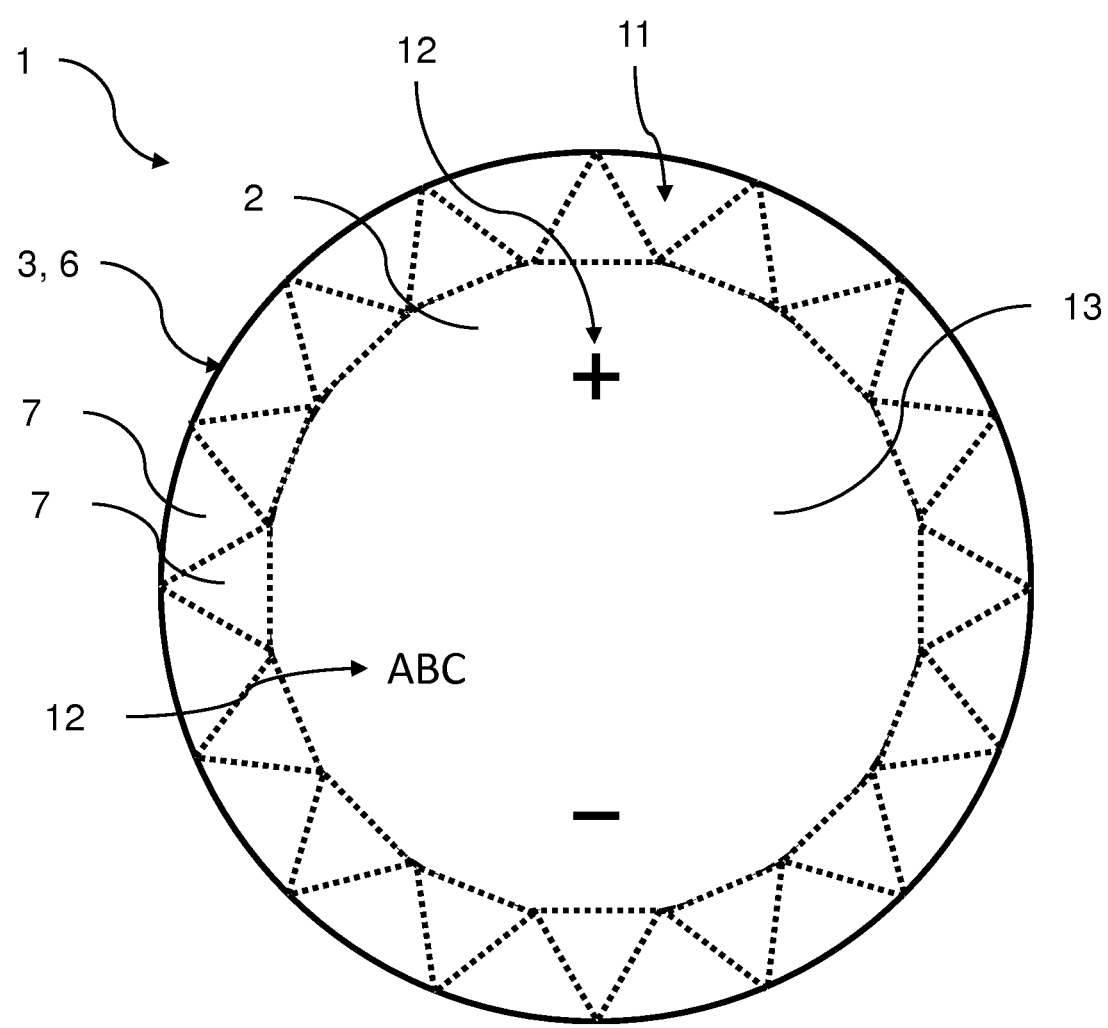
FIG. 1 a plan view of a preferred embodiment of a touch input apparatus according to the invention.

FIG. 1 schematically illustrates a plan view of a preferred embodiment of a touch input apparatus 1 according to the invention. The touch input apparatus 1 has a cover plate 2 having a circular plate upper side 3. The plate upper side 3 has, in a central region, a plurality of engravings 12, which denote for example different functions or input options of the touch input apparatus 1. In this exemplary embodiment, the cover plate 2 is formed from a transparent cover plate material, such as glass. Consequently, what can be seen are triangular sloping surfaces 7, which are formed in a periphery region 11 on a plate lower side 4 (cf. FIG. 2) of the cover plate 2, and a main surface 13 of the plate lower side 4 that is surrounded by the sloping surfaces 7. An operating surface 6 extends over the complete plate upper side 3 and consequently over the periphery region 11 and the main surface 13.

Figure 2:
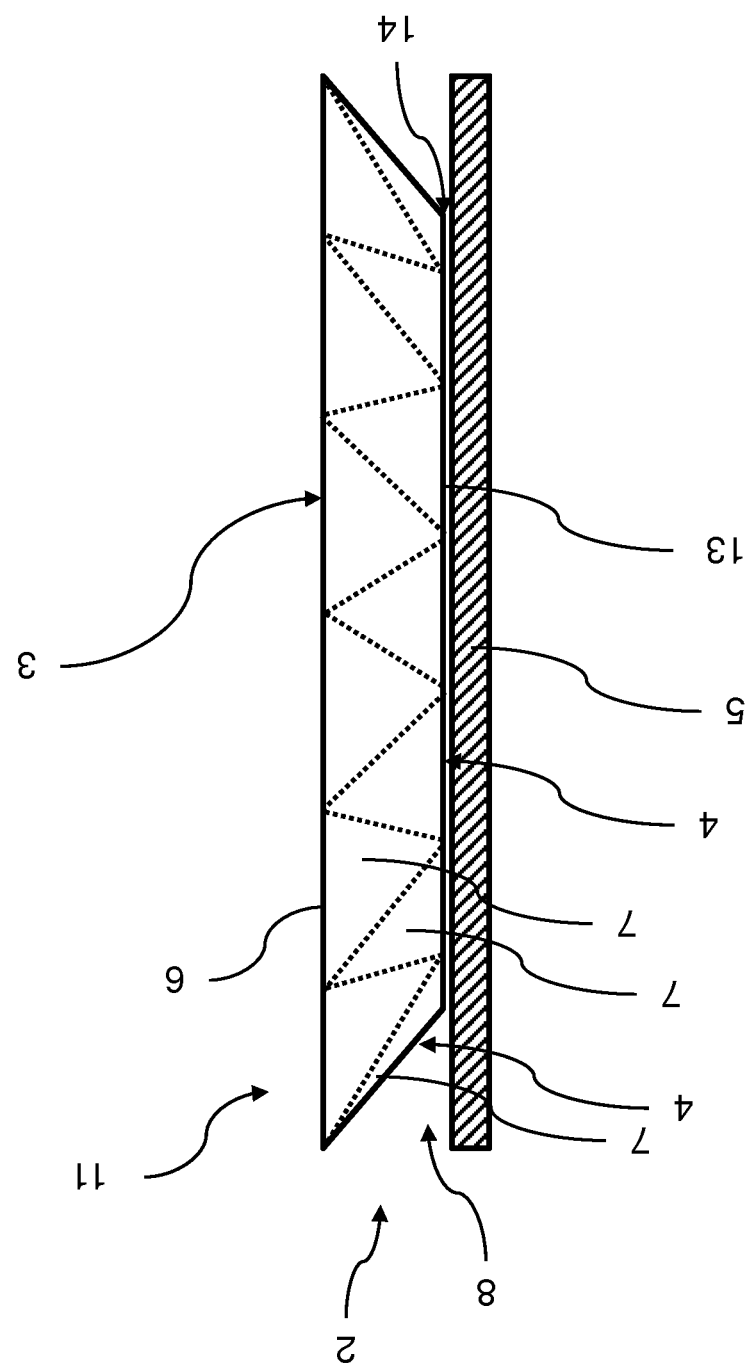
FIG. 2 a side view of the touch input apparatus without filling body from FIG. 1.

As can be seen more clearly from FIG. 2, the cover plate 2 has a plate lower side 4, which extends along the complete plate upper side 3. The plurality of triangular sloping surfaces 7 arranged in the periphery region 11 are likewise easily discernible in this view. The sloping surfaces 7 surround a main surface 13 of the plate lower side 4 around its entire circumference. Next to the plate lower side 4, the touch input apparatus 1 has a touch sensor surface 5, which extends like a plate along the entire plate lower side 4. In this exemplary embodiment, a gap 14 is formed between the main surface 13 and the touch sensor surface 5, with the result that there is no direct contact between the touch sensor surface 5 and the cover plate 2.

Figure 3:
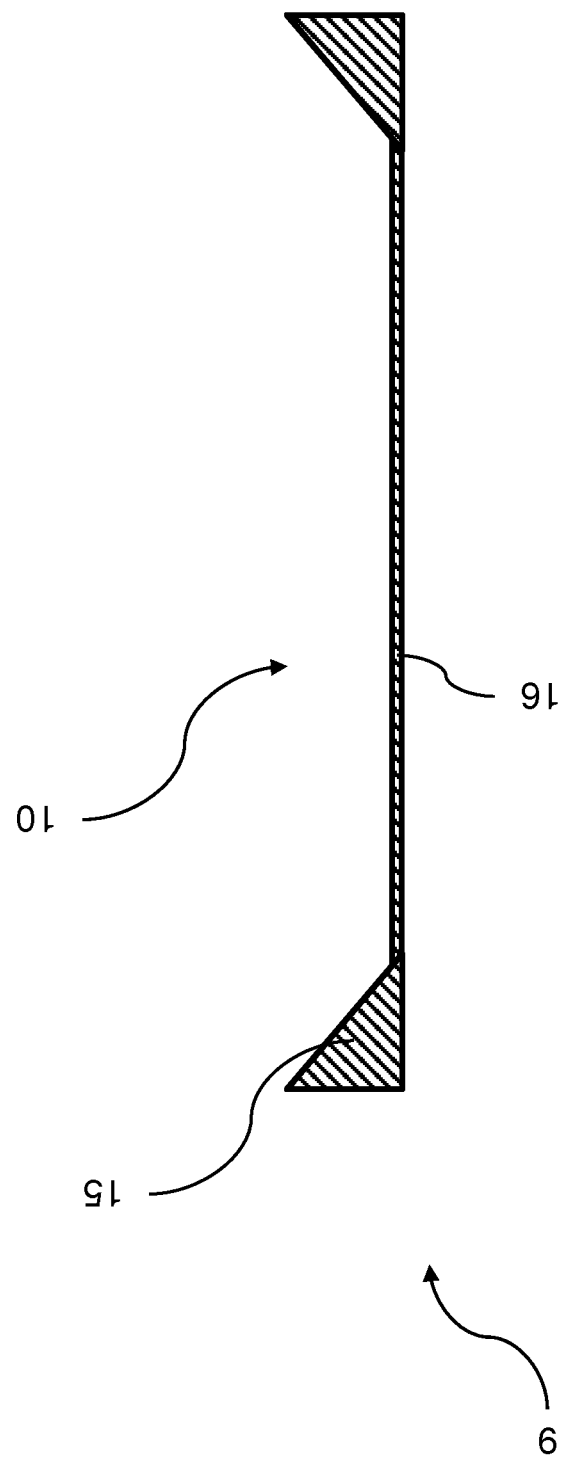
FIG. 3 a side view of the filling body from FIG. 1.

FIG. 3 schematically illustrates a side view of a filling body 9 of the preferred embodiment of the touch input apparatus 1 according to the invention from FIG. 1. The filling body 9 is formed from a preferably homogeneous filling material. The filling body has a ring-shaped edge 15 having a triangular cross-sectional area and a panel region 16. A recess 10 for accommodating the cover plate 2 is formed between the edge 15 and the panel region 16.

Figure 4:
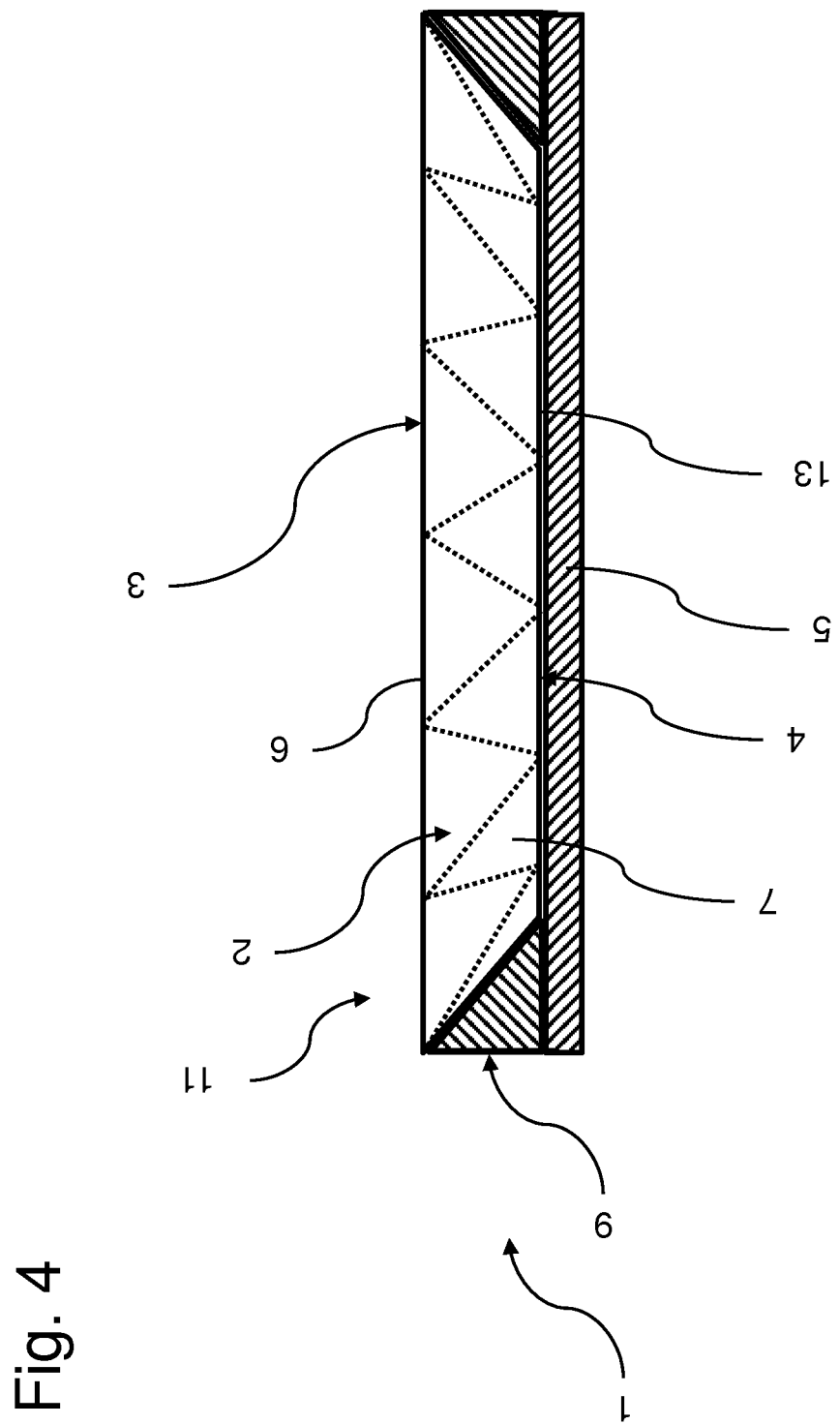
FIG. 4 a side view of the touch input apparatus from FIG. 1.

FIG. 4 schematically illustrates a side view of the touch input apparatus 1 from FIG. 1. The filling body 9 is arranged in the gap 14 (see FIG. 2) and in the free space 8 (cf. FIG. 2) between the plate lower side 4 and the touch sensor surface 5. In the touch input apparatus 1 according to the invention, use of the operating surface 6, which extends over the entire plate upper side 3, is possible without complicated compensation by a computer unit owing to the permittivity of the filling material, which corresponds to, or substantially corresponds to, the permittivity of the cover plate material.

LIST OF REFERENCES 1 touch input apparatus
2 cover plate
3 plate upper side
4 plate lower side
5 touch sensor surface
6 operating surface
7 sloping surface
8 free space
9 filling body
10 recess
11 periphery region
12 engraving
13 main surface
14 gap
15 edge
16 panel region The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A touch input apparatus configured to operate a system of a motor vehicle, the touch input apparatus comprising:
   a cover plate made from a cover plate material having a plate upper side and a plate lower side; and
   a touch sensor surface,
   wherein the plate upper side has an operating surface,
   wherein the plate lower side faces the touch sensor surface,
   wherein the plate lower side has at least one sloping surface arranged at an angle with respect to the touch sensor surface, wherein the at least one sloping surface is arranged in a periphery region of the cover plate, and wherein the at least one sloping surface provides a function of a visual decoration of the touch input apparatus or an identification of a function of the touch input apparatus,
   wherein a free space is formed between the at least one sloping surface and the touch sensor surface,
   wherein the operating surface projects over the at least one sloping surface and the free space in a region,
   wherein in the region of the operating surface that projects over the at least one sloping surface and the free space a filling body made of at least one filling material is arranged in the free space, and
   wherein the at least one filling material has a permittivity for electrical fields that substantially corresponds to a permittivity of the cover plate material.

2. The touch input apparatus as claimed in claim 1, where the filling body is in surface contact with the plate lower side and the touch sensor surface.

3. The touch input apparatus as claimed in claim 2, where the filling body has a filling body shape which is configured to be complementary to a free space shape of the free space.

4. The touch input apparatus as claimed in claim 2, wherein the filling body has a recess, in which the plate lower side is accommodated.

5. The touch input apparatus as claimed in claim 1, where the filling body has a filling body shape which is configured to be complementary to a free space shape of the free space.

6. The touch input apparatus as claimed in claim 5, wherein the filling body has a recess, in which the plate lower side is accommodated.

7. The touch input apparatus as claimed in claim 1, wherein the filling body is configured at least partially as an injection molded part or 3D printed part.

8. The touch input apparatus as claimed in claim 1, wherein the filling body has a recess, in which the plate lower side is accommodated.

9. The touch input apparatus as claimed in claim 1, wherein the plate lower side has a plurality of sloping surfaces, which are arranged on the plate lower side in the form of a facet cut.

10. The touch input apparatus as claimed in claim 1, wherein the cover plate material comprises glass.

11. The touch input apparatus as claimed in claim 1, wherein the cover plate exhibits an engraving and/or a print.

12. The touch input apparatus as claimed in claim 1, wherein the plate upper side is configured to be planar and/or round.

13. An electronic system for a motor vehicle having at least one input apparatus, wherein the at least one input apparatus is configured in the form of a touch input apparatus comprising:
- a cover plate made from a cover plate material having a plate upper side and a plate lower side; and
- a touch sensor surface,
- wherein the plate upper side has an operating surface,
- wherein the plate lower side faces the touch sensor surface,
- wherein the plate lower side has at least one sloping surface arranged at an angle with respect to the touch sensor surface, wherein the at least one sloping surface is arranged in a periphery region of the cover plate, and wherein the at least one sloping surface provides a function of a visual decoration of the touch input apparatus or an identification of a function of the touch input apparatus,
- wherein a free space is formed between the at least one sloping surface and the touch sensor surface,
- wherein the operating surface projects over the at least one sloping surface and the free space in a region,
- wherein in the region of the operating surface that projects over the at least one sloping surface and the free space a filling body made of at least one filling material is arranged in the free space, and
- wherein the at least one filling material has a permittivity for electrical fields that substantially corresponds to a permittivity of the cover plate material.

14. A motor vehicle comprising at least one electronic system having at least one input apparatus, wherein the at least one input apparatus is configured in the form of a touch input apparatus comprising:
- a cover plate made from a cover plate material having a plate upper side and a plate lower side; and
- a touch sensor surface,
- wherein the plate upper side has an operating surface,
- wherein the plate lower side faces the touch sensor surface,
- wherein the plate lower side has at least one sloping surface arranged at an angle with respect to the touch sensor surface, wherein the at least one sloping surface is arranged in a periphery region of the cover plate, and wherein the at least one sloping surface provides a function of a visual decoration of the touch input apparatus or an identification of a function of the touch input apparatus,
- wherein a free space is formed between the at least one sloping surface and the touch sensor surface,
- wherein the operating surface projects over the at least one sloping surface and the free space in a region,
- wherein in the region of the operating surface that projects over the at least one sloping surface and the free space a filling body made of at least one filling material is arranged in the free space, and
- wherein the at least one filling material has a permittivity for electrical fields that substantially corresponds to a permittivity of the cover plate material.

* * * * *